Aug. 29, 1967    H. A. PANISSIDI    3,338,256
FLOW SENSING VALVE
Filed Dec. 23, 1964
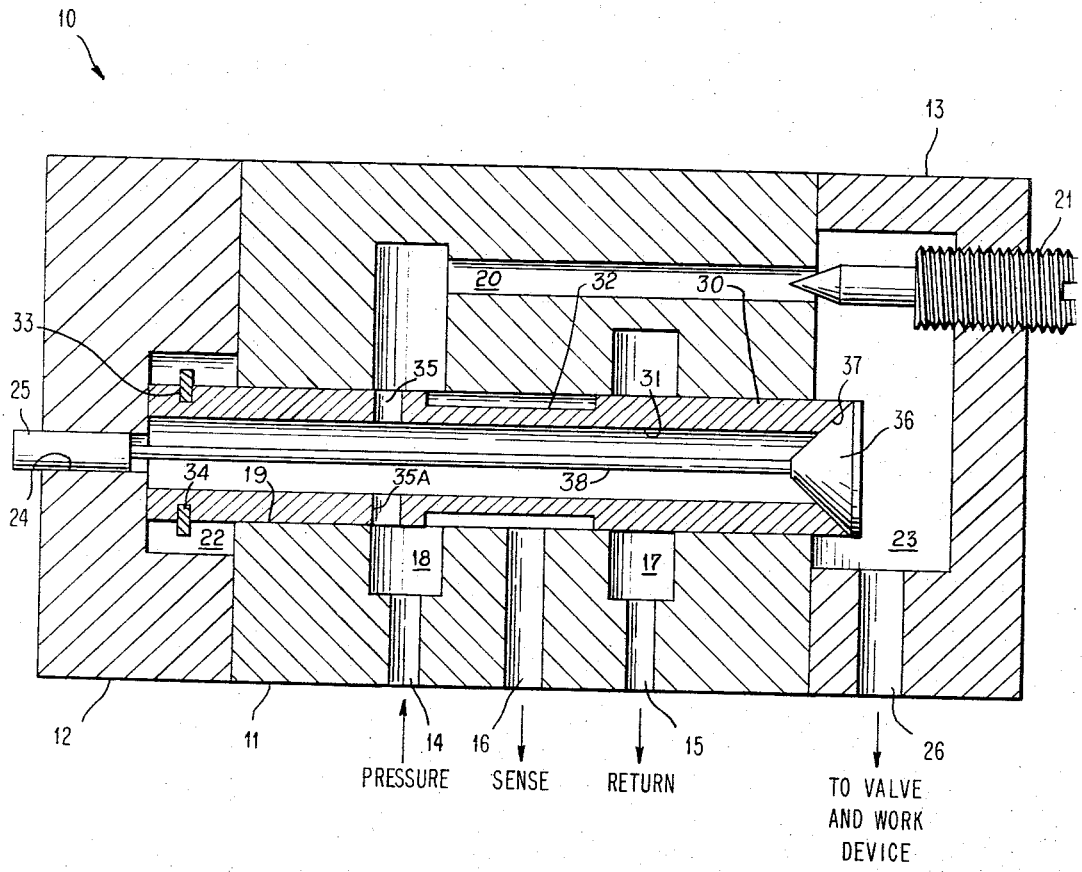
INVENTOR.
HUGO A. PANISSIDI
BY *Robert E. Sandt*
AGENT

United States Patent Office 3,338,256
Patented Aug. 29, 1967

3,338,256
FLOW SENSING VALVE
Hugo A. Panissidi, Peekskill, N.Y., assignor to International Business Machines Corporation, Armonk, N.Y., a corporation of New York
Filed Dec. 23, 1964, Ser. No. 420,578
3 Claims. (Cl. 137—110)

ABSTRACT OF THE DISCLOSURE

A tubular valve spool with fluid under source pressure in its inner bore, closed at one end by a poppet whose bias seals the poppet and biases the spool, responds to a drop in work-circuit pressure induced by a pressure drop across a restrictor connected between the source and the work-circuit which includes a valve end-chamber abutting the poppet, by moving toward that end chamber, the poppet opening to supply unrestricted flow to the work-circuit for the duration of the flow. The spool position selectively pressurizes a sense duct to signal the flow condition.

---

This invention relates to fluid devices and more particularly to a valve which is sensitive to small flows of fluid.

Sequencing valves operative responsive to the flow of fluid in a work circuit to control a desired subsequent operation are well known. Generally, these devices operate responsive only to substantial flow rates and do not provide for unrestricted flow of fluid to the work device. A typical prior art valve for this purpose supplies fluid to the work device through a flow restrictor. Opposed valve chambers connected upstream and downstream of the flow restrictor detect the difference in fluid pressures as the fluid flows through the restrictor to the work circuit. The downstream chamber pressure communicates with the larger end of a spool valve having its smaller end in communication with the upstream chamber. During no flow the spool valve moves towards the end having the lesser area. When flow passes the restrictor, the pressure drop is greater than the area differential on the valve spool ends, and the valve transfers toward the larger area end. As soon as the work device reaches the limit of its stroke, is stalled, or its control valve closed, the pressure in the two opposing chambers equalizes and the valve spool restores. The valve spool contains lands which coact with ports in the housing to provide a hydraulic signal indicative of the flow condition. With such an arrangement, prior art devices compelled the flow to pass through a restrictor, thus necessarily penalizing flow to the work device.

The device of the present invention overcomes the foregoing drawback of prior art devices by providing full flow to the work device after the initial flow through a flow restrictor. It also provides a greater sensitivity to small volumes of flow. It, like the prior art devices, senses the need of the work device for fluid by supplying fluid thereto through a flow restriction. It also employs opposing unbalanced piston areas communicating with chambers connected upstream and downstream of the flow restrictor. Like the prior art these unbalanced areas cause movement of a spool valve when fluid moves into the work circuit. However, unlike the prior art devices, the instant device by the movement of the spool valve opens the work circuit to full unrestricted flow independent of the flow restriction. This then not only improves the valve sensitivity but also provides increased fluid flow into the work circuit.

It is, therefore, an object of this invention to provide a fluid flow sensing valve having an element which is moved in response to an initial flow of fluid through flow restrictor, which element includes a further element that moves responsive to dynamic forces to open full fluid flow to the work device.

A further object of the invention is to provide a flow sensing valve having a flow restrictor interposed between the source of fluid supply and the work device, a pair of chambers communicating respectively upstream and downstream of the flow restrictor, a spool valve having its opposing ends exposed to the pressure in the two chambers, whereby the spool valve will transfer when the pressure in the downstream chamber falls because of flow into the work circuit, the spool valve being provided with a poppet valve and auxiliary piston having unbalanced forces thereon, which poppet valve opens upon movement of the spool valve to provide full flow to the work circuit.

The foregoing and other objects, features and advantages of the invention will be apparent from the following more particular description of a preferred embodiment of the invention, as illustrated in the accompanying drawing.

In the drawing:

The sole drawing shows schematically the cross-sectional structure of the valve embodying the invention.

In the drawing, the valve body 10 consists basically of the central section 11 and the two end caps 12 and 13 which when joined by conventional fasteners effectively produce a unitary structure. The central section 11 contains the ducts 14 (pressure), 15 (return), and 16 (sense). These are conventional valve connections such that the sense duct is selectively interconnected with either the pressure duct 14 or the return duct 15, depending on the spool position. Return duct 15 communicates with the undercut chamber 17 in the conventional valve construction. In a similar manner, duct 14 communicates with the undercut chamber 18. These chambers permit fluid to surround the spool, travelling within the housing in bore 19, which extends through the central housing section 11 and is in full communication with the circumferential chambers 17 and 18. The chamber 18, which is connected via duct 14 to the source of fluid under pressure, connects with a by-pass duct 20 which is adjustably throttled by a needle valve 21 threaded into the end cap 13.

The end caps 12 and 13 are hollowed out to form two chambers. Chamber 22 is formed in end cap 12, and the chamber 23 is formed in end cap 13. The chamber 22 communicates with the atmosphere through a cylindrical axial bore 24, which is sealed by a piston 25, to be described. The chamber 23 communicates with the by-pass duct 20, and for non-operating conditions contains fluid at system pressure. The chamber 23 is connected via duct 26 to the valve that is opened to permit fluid flow into the work circuit.

Sliding within the bore 19 of the housing 10 is the valve spool 30. This spool is actually a tube in that it contains a central bore 31. A reduced portion 32 cut into the spool forms the valve lands which transfer the connection of the sense duct 16 to either the duct 14 or 15 in conventional valve fashion. A circumferential groove 33 in the valve spool 30 receives a snap ring 34 which abuts against the end face of the central housing section 11 to act as a stop when the spool 30 moves to the right. Two radial holes 35A and 35 through the walls of the tubular valve spool 30 provide fluid passage from the circumferential chamber 18 into the bore 31 of the spool in all positions of the spool 30.

A poppet valve 36 having a conical valve face seats against the mating valve seat 37 in the valve spool 30. The poppet valve 36 is secured to the valve stem 38 to which in turn is fastened the piston 25.

The valve and the parts, as above described, occupy the no-flow condition as viewed in FIG. 1. Here, the sense duct 16 is connected with the pressure duct 14 and the return duct 15 is sealed. Fluid from the pressure supply duct 14 fills the chamber 18, the by-passes duct 20 and the chamber 23 with fluid at supply pressure. Fluid at supply pressure also fills bore 31 and through leakage around the ends of valve spool 30, the chamber 22. Thus, the chambers 22 and 23 contain fluid at like pressures and produce no unbalanced forces upon the valve spool 30. But for other forces, the spool 30 would float. However, the small piston 25 has system pressure on its right face and atmospheric pressure on its left. It, therefore, is urged to the left carrying with it the valve stem 38, the poppet 36, and the spool 30, thus moving all of the elements to the position shown.

When the valve controlling the work device opens and the duct 26 instantaneously drops in pressure as fluid starts to flow across restrictor 21 into the work circuit, the pressure in chamber 23 will correspondingly fall. Spool 30, therefore, considered for the moment as a solid spool, has system pressure on its left end from chamber 22 and near zero pressure on its right end. This pressure unbalance will more than offset the unbalanced pressures on piston 25, forcing the poppet 36, valve stem 38, and piston 25 to move with the spool 30. When the snap ring 34 strikes the end face of the center housing section 11, movement of the spool 30 stops. However, the poppet 36 has system pressure across an area equal to the bore 31 and near zero pressure on its right face. This pressure unbalance coupled with the inertia of the poppet continues movement of the poppet to the right when the valve sleeve 30 stops. The unseating of poppet valve 36 from its seat 37 now opens fluid flow from the bore 31 to chamber 23 and to the work circuit. While the flow is now relatively unrestricted and pressure in chamber 23 will rise, it will not rise to the system pressure, while chamber 22 remains at system pressure. Spool 30 will remain to the right against its stop so long as flow continues. The poppet 36, now without any pressure differential across its opposed faces, is however, in the full fluid stream and subject to the dynamic force thereof. It will, therefore, remain to the right against the restoring force of the piston 25, which still experiences a force unbalance.

In the position to the right the valve spool 30 connects the sense duct 16 to the return duct 15.

When flow ceases into the duct 26 and the fluid pressure in it and chamber 23 rises rapidly toward system pressure, the dynamic forces acting on poppet 36 will cease with the cessation of flow. Piston 25, will, therefore, now be effective to move poppet 36 to the left until its seats in on valve 37, picking up and moving the spool 30 to its extreme left position.

From the foregoing explanation it will be appreciated that the duct 16 "senses" the position of the valve spool 30, and thus the flow and no-flow condition. For no-flow duct 16 is pressurized, and for flow its pressure is atmospheric.

The needle valve 21 is adjusted so as to permit the usual system leakage into duct 26 as the work device valve by-passes fluid to sump through valve clearances. This adjustment is a matter of experiment and dictated by the system dynamics, or "stiffness."

It must be appreciated that the drawing is only a schematic representation of an actual valve and that many structural details have been intentionally simplified and others eliminated so as not to obscure lucidity of the invention. These details would, in practice, be supplied by the skilled artisan without the exercise of the invention. The principles of the invention however are preserved in the schematic drawing.

While the invention has been particularly shown and described with reference to a preferred embodiment thereof, it will be understood by those skilled in the art that various changes in form and details may be made therein without departing from the spirit and scope of the invention.

What is claimed is:

1. A hydraulic flow sensing valve operative responsive to the flow of fluid into a work circuit to produce a pressure signal indicative of the flow condition, comprising:
   (a) a source of fluid under pressure;
   (b) a work circuit duct connecting with the work circuit;
   (c) a flow restriction device connected in series between said source of fluid and said work circuit duct;
   (d) a pair of opposed fluid chambers connected one with said source of fluid and the other with said work circuit duct;
   (e) a spool valve having the opposed end surfaces thereof exposed to the fluid pressure in said chambers;
   (f) means for biasing said spool valve in a direction away from the chamber in communication with the downstream end of said flow restrictor;
   (g) means responsive to the movement of said spool toward the downstream connected chamber for opening fluid flow from said source of fluid under pressure to said work circuit duct to by-pass said flow restrictor, and
   (h) lands on said valve spool for controlling the production of a fluid pressure signal manifestive of the position of the valve spool.

2. A hydraulic flow sensing valve operative responsive to the flow of fluid into a work circuit to produce a pressure signal indicative of the flow condition, comprising:
   (a) a housing;
   (b) a pair of fluid chambers in said housing, and a cylindrical bore therebetween;
   (c) a tubular spool valve slideably disposed within said bore said spool valve having exterior lands for the control of fluid pressure to produce the pressure signal indicative of the position of the spool;
   (d) a source of fluid under pressure;
   (e) a duct connecting with a first one of said chambers and operative to supply working fluid to a work device;
   (f) a flow restrictor connected between said source of fluid and said first one of said chambers;
   (g) a poppet valve coacting with a matching seat on the end of said tubular spool in communication with said first one of said chambers;
   (h) means for introducing fluid from said source into the hollow bore of said tubular spool valve;
   (i) an axial bore between the second one of said chambers and the atmosphere;
   (j) a piston disposed in said axial bore;
   (k) and a structural link connecting said piston and said poppet valve,
   whereby the movement of fluid into said duct will decrease in pressure in said first chamber to cause said spool valve to move toward that chamber and said poppet valve to unseat from said tubular spool to open the flow of fluid from the bore of said spool to said first chamber.

3. A flow sensing valve, comprising:
   (a) a source of fluid under pressure and a duct connecting with a device the flow to which is to be detected;
   (b) a flow restrictor serially connected between said source of fluid and said duct;

(c) means responsive to the pressure differential across said flow restrictor for effecting a mechanical displacement of a member;

(d) means responsive to the mechanical displacement of the member for directly connecting said duct to said source of supply to effect a fluid flow therebetween to by-pass said flow restrictor; and (e) means for effecting the reverse mechanical displacement of the member when flow ceases into the said duct, and (f) means responsive to the displacement of the member for producing a pressure signal uniquely manifestive of the position of the member.

References Cited

UNITED STATES PATENTS 2,808,068  10/1957  Thomas _____ 137—110
2,995,141  8/1961   Hipp _____ 137—110 X STANLEY N. GILREATH, *Primary Examiner.*